United States Patent
Kang et al.

(10) Patent No.: US 8,170,523 B2
(45) Date of Patent: May 1, 2012

(54) SUPER REGENERATIVE RECEIVER AND METHOD OF SAVING POWER OF THE SAME

(75) Inventors: Hoyong Kang, Daejeon (KR); Xiaohua Yu, Daejeon (KR); Ji Eun Kim, Choongcheongbuk-do (KR); Trung Kien Nguyen, Daejeon (KR); Dae Young Yoon, Seoul (KR); Nae Soo Kim, Daejeon (KR); Cheol Sig Pyo, Daejeon (KR); Seok Kyun Han, Deajeon (KR); Sang Gug Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 622 days.

(21) Appl. No.: 12/333,974

(22) Filed: Dec. 12, 2008

(65) Prior Publication Data

US 2009/0156158 A1 Jun. 18, 2009

(30) Foreign Application Priority Data

Dec. 12, 2007 (KR) .................. 10-2007-0129172
Nov. 10, 2008 (KR) .................. 10-2008-0111207

(51) Int. Cl.
*H04B 1/16* (2006.01)
(52) U.S. Cl. ........................ 455/336; 331/185
(58) Field of Classification Search .............. 340/572.1; 342/357.57; 455/336; 331/185
See application file for complete search history.

(56) References Cited

U.S. PATENT DOCUMENTS

| | | | |
|---|---|---|---|
| 6,320,464 B1 * | 11/2001 | Suzuki et al. ............ | 330/151 |
| 6,668,165 B1 | 12/2003 | Cloutier | |
| 6,774,838 B2 * | 8/2004 | Sun .......................... | 342/357.57 |
| 7,005,985 B1 * | 2/2006 | Steeves ..................... | 340/572.1 |
| 2007/0139130 A1 * | 6/2007 | Kim et al. ................. | 331/185 |
| 2007/0259629 A1 | 11/2007 | Lee et al. | |

FOREIGN PATENT DOCUMENTS

| | | |
|---|---|---|
| JP | 10-173567 | 6/1998 |
| KR | 10-0665330 | 1/2007 |
| KR | 10-0683347 | 2/2007 |

OTHER PUBLICATIONS

Korean Office Action mailed Oct. 27, 2010 in corresponding Korean Application No. 10-2008-111207.
Korean Notice of Allowance mailed Dec. 30, 2010 in corresponding Korean Application No. 10-2008-111207.
Edwin H. Armstrong., "Some Recent Developments of Regenerative Circuits", Jun. 7, 1922, pp. 244-260.
Alexandre Vouilloz et al., "A Low-power CMOS Super-Regenerative Receiver at 1 GHz", IEEE 2000 Custom Integrated Circuits Conference, pp. 167-170.
B. Otis et al., "A 400μW-RX, 1.6mW-TX Super-Regenerative Transceiver for Wireless Sensor Networks", ISSCC 2005 /SESSION21 /TD:RF TREMDS: Above-IC Integration and MM-Wave /21.4.3 pages.
Jia-Yi Chen et al., "A Fully Integrated Auto-Calibrated Super-Regenerative Receiver", ISSCC 2006 / Session 20/ WLAN/ WPAN/ 20.8. 10 pages.
F. Xavier Moncunill-Geniz et al., "An 11-Mb/s 2.1-mW Synchronous Superregenerative Receiver at 2.4 GHz", IEEE Transactions on microwave theory and techniques, vol. 55, No. 6, Jun. 2007.

* cited by examiner

*Primary Examiner* — Jean B Jeanglaude
(74) *Attorney, Agent, or Firm* — Staas & Halsey LLP

(57) ABSTRACT

A low power super regenerative receiver and a method of reducing the power consumption of the low power super regenerative receiver are provided. The super regenerative receiver includes: an oscillator having a start-up time period starting oscillation that varies according to an existence of an input signal; and a power controller supplying power within the start-up time period of the oscillator.

11 Claims, 9 Drawing Sheets

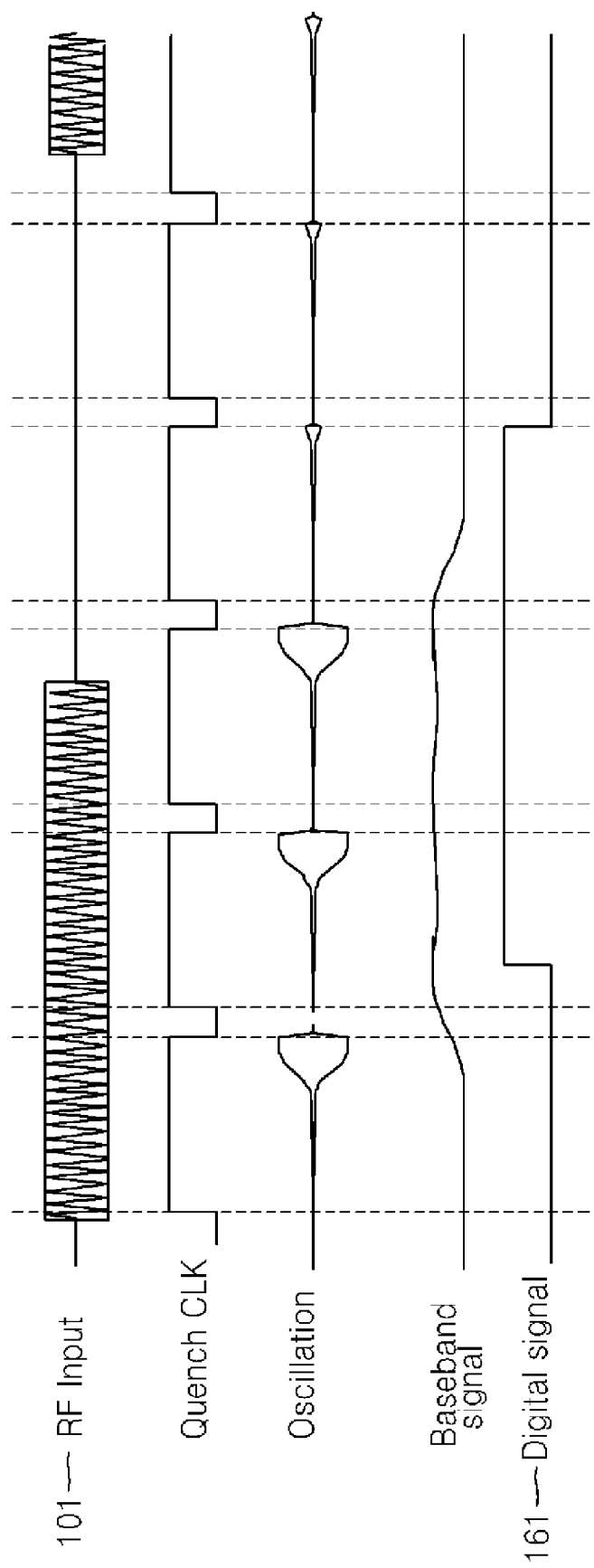

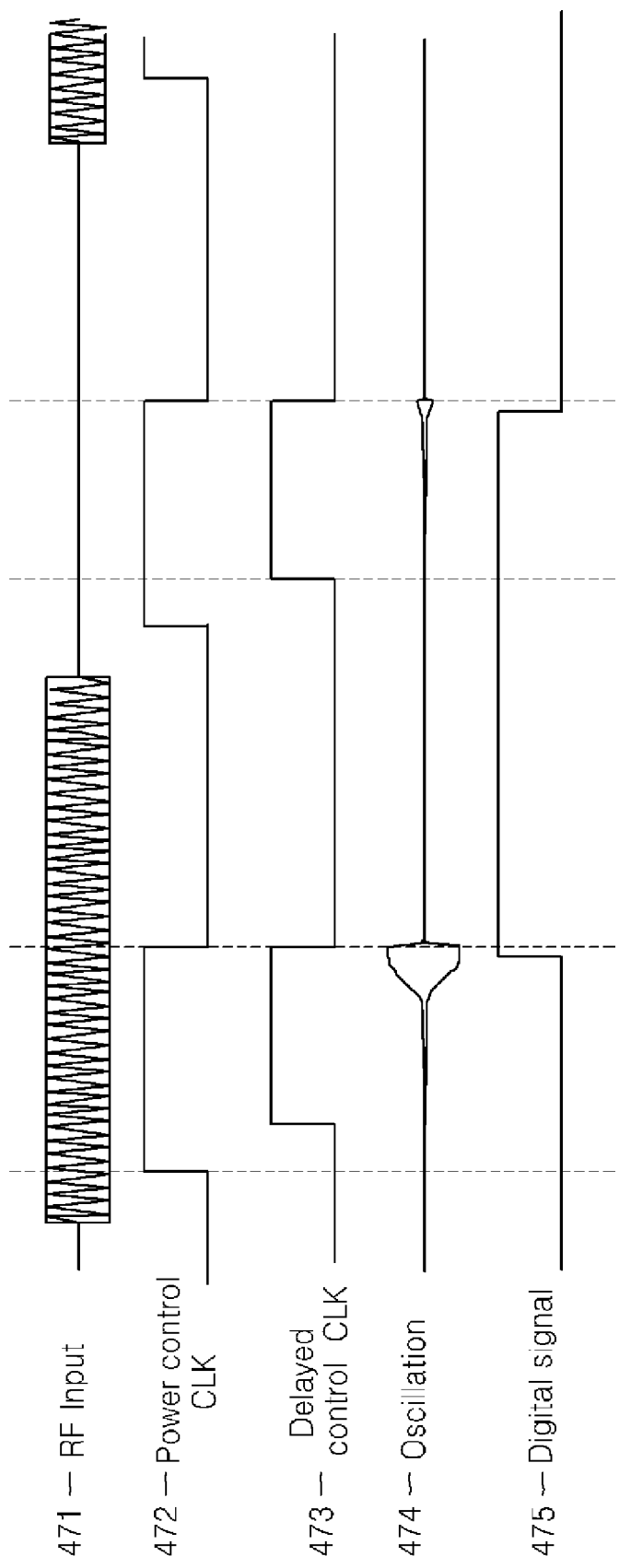

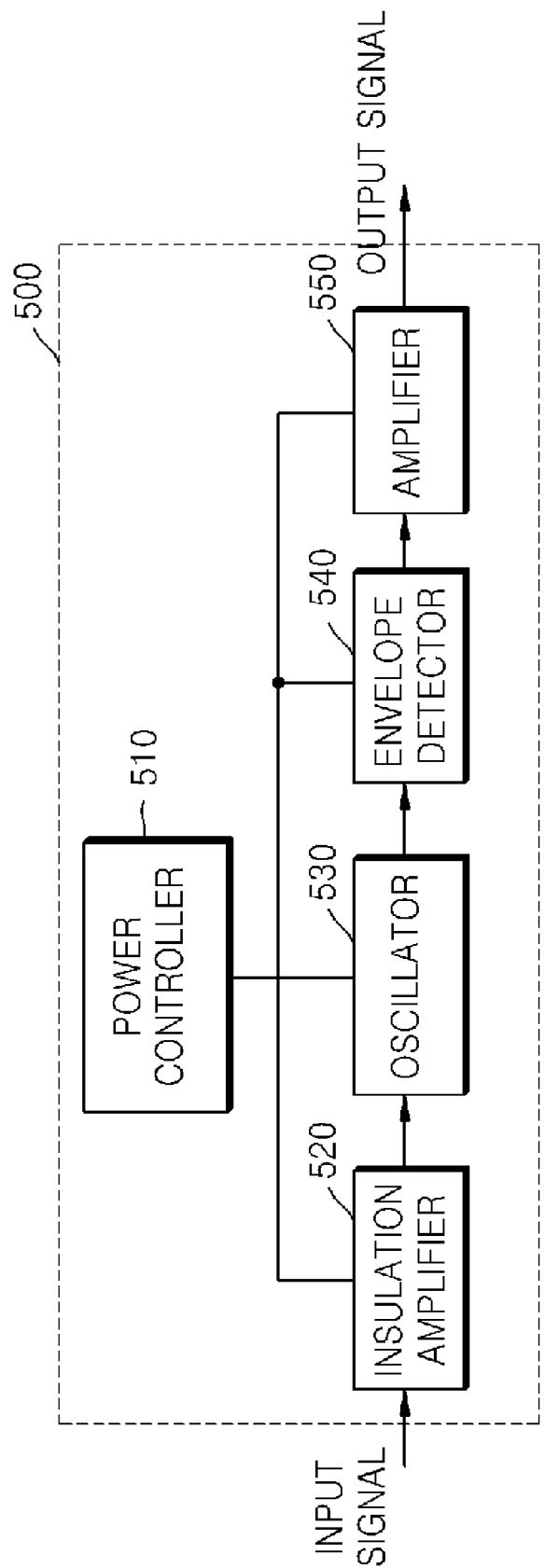

SUPER REGENERATIVE RECEIVER AND METHOD OF SAVING POWER OF THE SAME

CROSS-REFERENCE TO RELATED PATENT APPLICATION

This application claims the benefit of Korean Patent Application Nos. 10-2007-0129172, filed on Dec. 12, 2007, 10-2008-0111207, filed on Nov. 10, 2008, in the Korean Intellectual Property Office, the disclosure of which is incorporated herein in its entirety by reference.

BACKGROUND OF THE INVENTION

1. Field of the Invention

The present invention relates to a super regenerative receiver, and more particularly, to a super regenerative receiver which reduces average power consumption by periodically turning on/off the power in correspondence with the power state of an oscillator which periodically turning on/off.

The present invention is derived from a research project supported by the Information Technology (IT) Research & Development (R&D) program of the Ministry of Information and Communication (MIC) and the Institute for Information Technology Advancement (IITA) [2005-S-106-03, Development of Sensor Tag and Sensor Node Techniques for RFID/USN].

2. Description of the Related Art

Super regenerative receivers are known for their moderate sensitivity and low cost. Super regenerative receivers have been widely applied to remote control toys, alarm systems, and monitors.

Super regenerative receivers detect a signal based on a start-up time of an oscillator. The start-up time depends on the power and frequency of a signal received by an antenna. Even without the input signal, the oscillator may oscillate due to the thermal noise very slowly.

Conventional super regenerative receivers may be classified into two categories; general super regenerative receivers for over-sampling an input signal and synchronous super regenerative receivers for over-sampling an input signal only once.

SUMMARY OF THE INVENTION

It is required to further reduce power consumption of a receiver due to a demand to extend the lifetime of a wireless sensor network. However, current receiver architectures cannot meet such a low power requirement without degrading sensitivity. Conventional general super regenerative receivers and synchronous super regenerative receivers have difficulties in further reducing power consumption with currently available technologies.

The present invention provides a method of controlling duty cycle power as a quenching means in a super regenerative receiver so as to reduce average power consumption of the super regenerative receiver while maintaining selectivity and sensitivity thereof. The method comprises adjusting a duty cycle ratio, and periodically turning off the power of the super regenerative receiver, thereby reducing the power consumption of the super regenerative receiver.

According to an aspect of the present invention, there is provided super regenerative receiver comprising: an oscillator having a start-up time period starting oscillation that varies according to an existence of an input signal; and a power controller supplying power within the start-up time period of the oscillator.

The power controller may use a duty cycle to supply power, and a duty cycle ratio between a clock off period and clock on period of the duty cycle is changed by adjusting the frequency of the duty cycle.

The super regenerative receiver may further comprise: an insulation amplifier injecting a signal into the oscillator and providing reverse isolation of the input signal from the oscillator; an envelope detector detecting an envelope of the oscillator; and an amplifier amplifying the envelope, wherein the power controller is connected to the insulation amplifier, the oscillator, the envelope detector, and the amplifier.

A power off period may be extended until the frequency of the duty cycle is the same as a data rate of the input signal.

According to another aspect of the present invention, there is provided a method of reducing power consumption of a super regenerative receiver comprising an oscillator having a start-up time period starting oscillation that varies according to an existence of an input signal, wherein the method comprises: controlling power by supplying the power to the super regenerative receiver within the start-up time period of the oscillator.

The super regenerative receiver may further comprise: an insulation amplifier injecting a signal into the oscillator and providing reverse isolation of the input signal from the oscillator; an envelope detector detecting an envelope of the oscillator; and an amplifier amplifying the envelope, wherein the controlling of the power comprises: supplying the power to the insulation amplifier, the oscillator, the envelope detector, and the amplifier within the start-up time period of the oscillator.

BRIEF DESCRIPTION OF THE DRAWINGS

The above and other features and advantages of the present invention will become more apparent by describing in detail exemplary embodiments thereof with reference to the attached drawings in which:

FIGS. 1A and 1B are, respectively, block and timing diagrams of a conventional super regenerative receiver;

FIGS. 4A and 4B are, respectively, block and timing diagrams of a super regenerative receiver for sequentially controlling a duty cycle, according to an embodiment of the present invention; and FIG. 5 is a block diagram of a super regenerative receiver according to an embodiment of the present invention.

DETAILED DESCRIPTION OF THE INVENTION

Figure 1A:
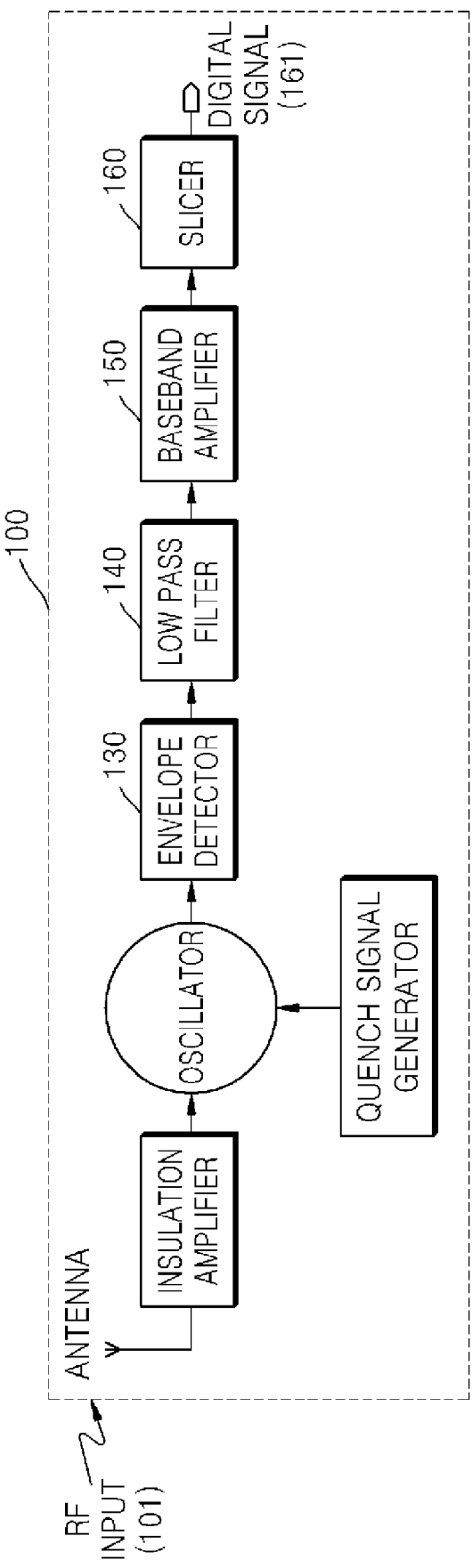

The present invention will now be described more fully with reference to the accompanying drawings, in which exemplary embodiments of the invention are shown. Like reference numerals refer to the like elements throughout. In this regard, the present embodiments may have different forms and should not be construed as being limited to the descriptions set forth herein. Accordingly, the embodiments are merely described below, by referring to the figures, to explain aspects of the present invention.

FIGS. 1A and 1B are, respectively, block and timing diagrams of a conventional super regenerative receiver 100. Referring to FIGS. 1A and 1B, the conventional super regenerative receiver 100 over-samples an input signal 101. In this case, a quench frequency is required to be much greater than an input signal data rate R. A cut-off frequency of a low pass filter 140 is much larger than the input signal data rate R and much smaller than the quench frequency in order to remove a quench signal from a signal that passes through an envelope detector 130.

Therefore, the quench frequency must be at least twice as large as the input signal data rate R. The input signal 101 that has passed through the low pass filter 140 is consequently demodulated, is amplified in a baseband amplifier 150, and is recovered as a digital signal 161 by a slicer 160.

Figure 2A:
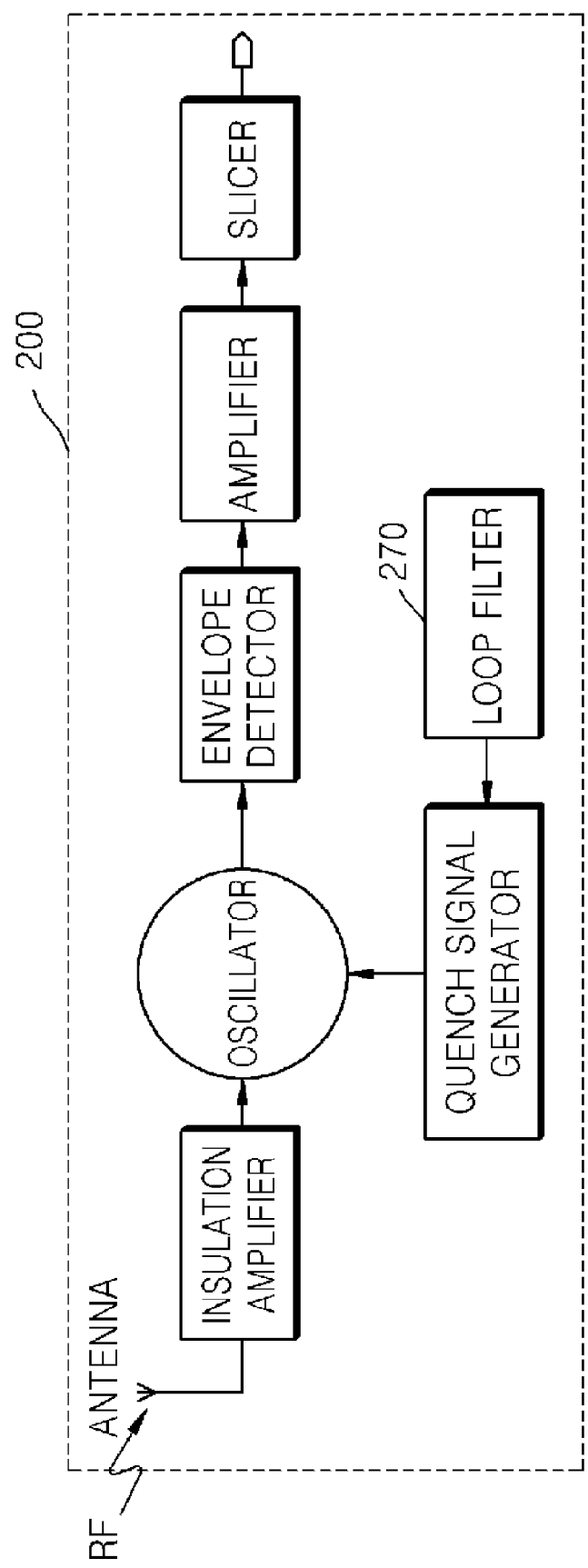
FIGS. 2A and 2B are, respectively, block and timing diagrams of a conventional synchronous super regenerative receiver.
Figure 2B:
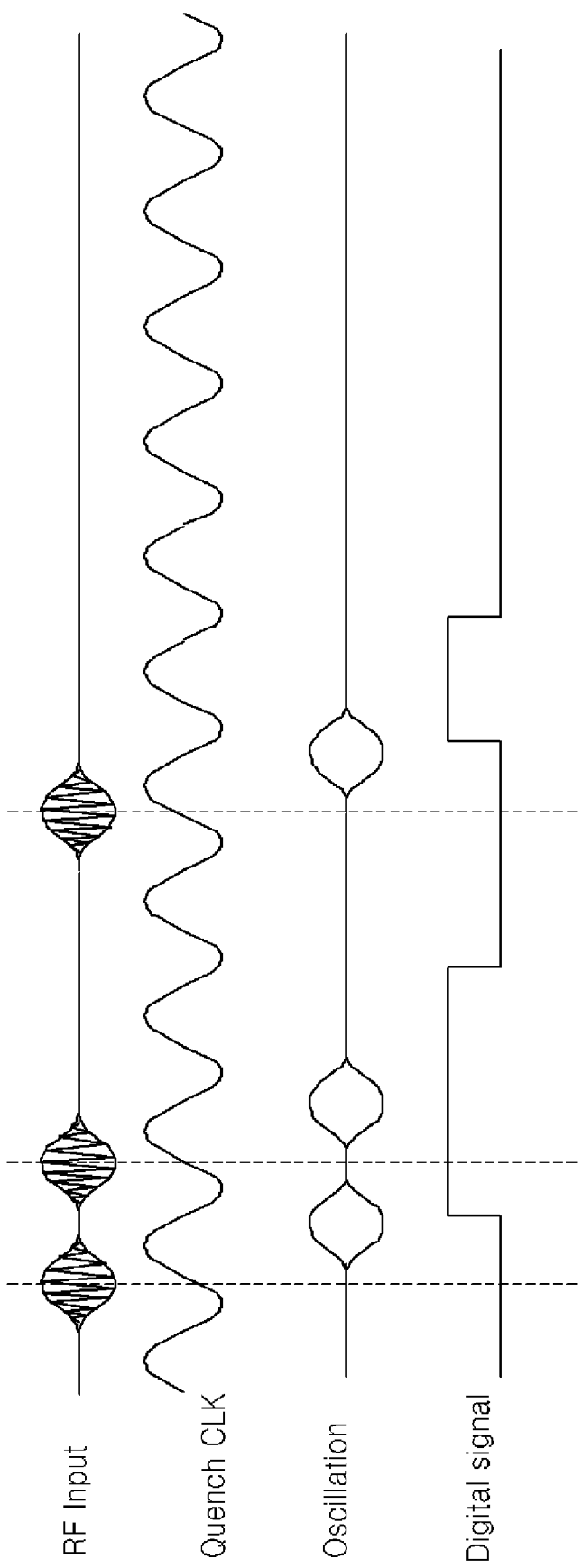

FIGS. 2A and 2B are, respectively, block and timing diagrams of a conventional synchronous super regenerative receiver 200. Referring to FIGS. 2A and 2B, the synchronous super regenerative receiver 200 samples an input signal only once. In this case, a quench frequency is almost the same as the input signal data rate R that rapidly increases. In more detail, the conventional synchronous super regenerative receiver 200 may receive a greater number of bits than the conventional super regenerative receiver 100 shown in FIGS. 1A and 1B during the same period of time, thereby increasing a data transmission rate.

The conventional super regenerative receiver 100 shown in FIGS. 1A and 1B expresses data of 1 bit through at least several clock cycles by over-sampling an input signal of 1 bit and performing at least several clock cycles. Meanwhile, the conventional synchronous super regenerative receiver 200 shown in FIGS. 2A and 2B expresses data of 1 bit by sampling the input signal of 1 bit only once, thereby receiving a much greater number of bits compared to the conventional super regenerative receiver 100 shown in FIGS. 1A and 1B during the same period of time, so that a data transmission rate increases.

A data rate loop filter 270 of the conventional synchronous super regenerative receiver 200 is used to synchronize the input data and quench signal.

A basic process performed by a super regenerative receiver of the present invention comprises periodically turning on and off the overall power of the super regenerative receiver, unlike the conventional concept of the conventional super regenerative receivers shown in FIGS. 1 and 2 of periodically turning on and off an oscillator.

The average power consumption of the super regenerative receiver of the present invention is further reduced by extending a period when the power of the super regenerative receiver is turned off. The period when the power of the super regenerative receiver is turned off may be extended until the input signal data rate R is the same as a clock frequency of a control signal for controlling the overall power. Hereinafter, the super regenerative receiver of the present invention will be described.

Figure 3A:
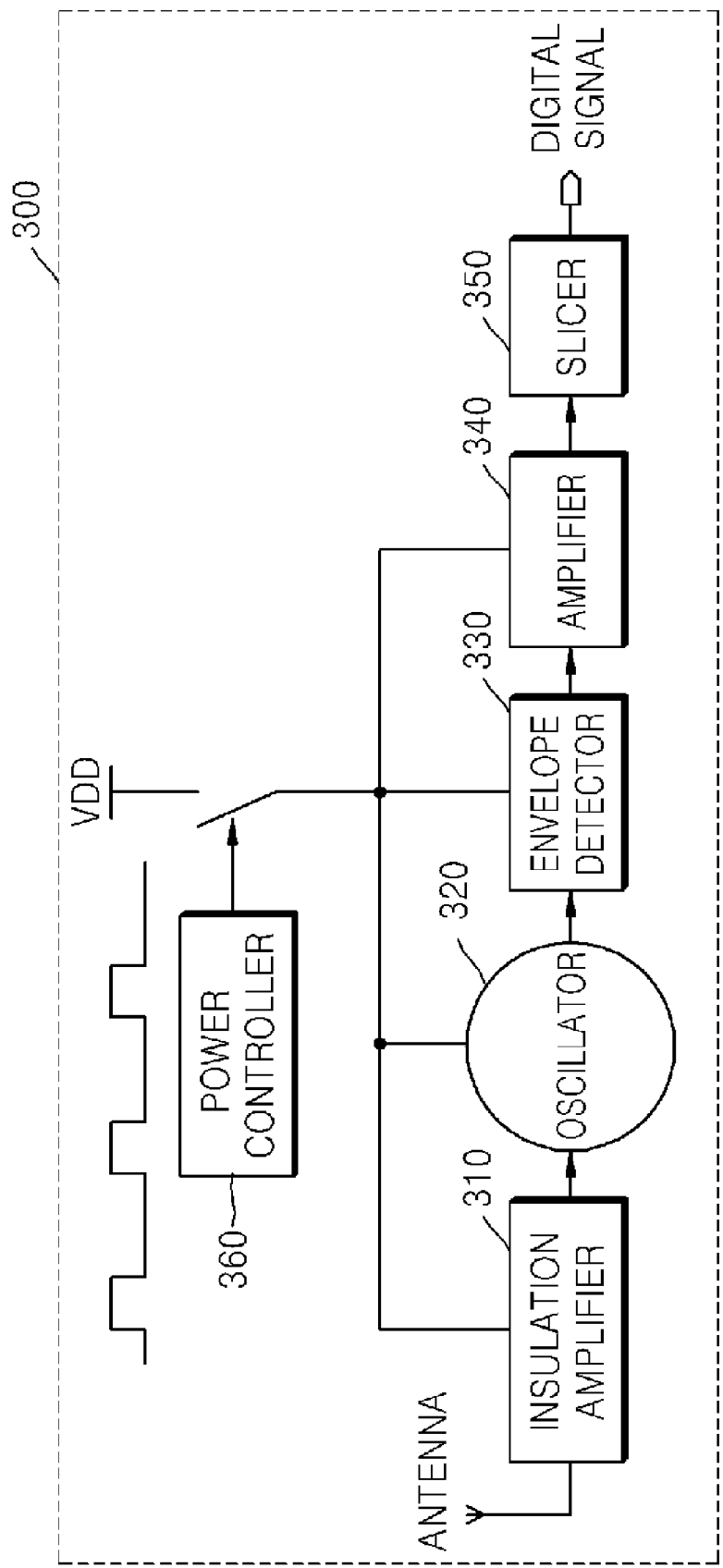
FIGS. 3A and 3B are, respectively, block and timing diagrams of a super regenerative receiver for controlling a duty cycle, according to an embodiment of the present invention.
Figure 3B:
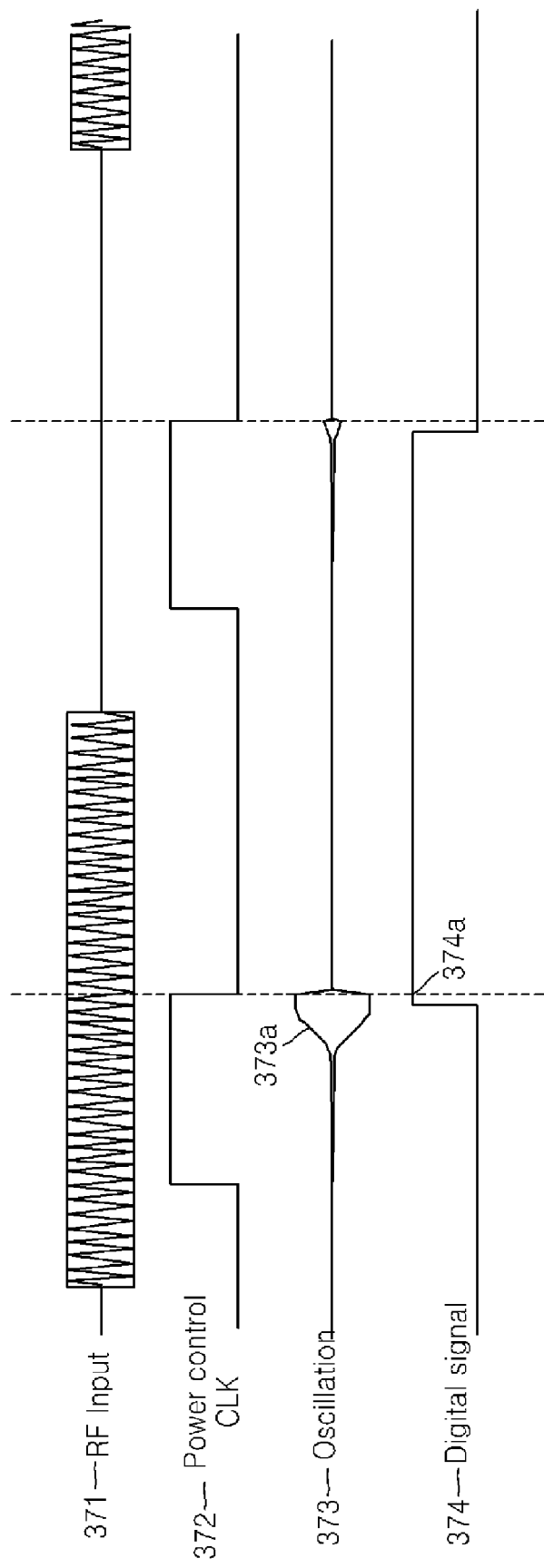

FIGS. 3A and 3B are, respectively, block and timing diagrams of a super regenerative receiver 300 for controlling a duty cycle, according to an embodiment of the present invention.

Referring to FIG. 3A, the power of the super regenerative receiver 300 periodically turns on and off, unlike the conventional method of periodically turning on and off an oscillator 320. In more detail, the super regenerative receiver 300 detects a signal during a start-up period when the oscillator 320 starts oscillating.

The power of the super regenerative receiver 300 turns off while the oscillator 320 is turned off, thereby reducing the consumption power from a power supply. Furthermore, the average power consumption of the super regenerative receiver 300 is further reduced by extending a period during which the overall power of the super regenerative receiver 300 is turned off.

The amount of power consumed by the super regenerative receiver 300 may be adjusted by controlling a ratio of the duty cycle frequency of power control clocks 372 and 472. The ratio of the duty cycle frequency may be controlled by adjusting the duty cycle frequency. In more detail, the duty cycle frequency of the power control clocks 372 and 472 is extended so that the duty cycle frequency is the same as that of an input data rate. The input data rate is the number of bits transmitted for a second.

The super regenerative receiver 300 comprises an insulation amplifier 310, an oscillator 320, an envelope detector 330, an amplifier 340, a slicer 350, and a power controller 360.

The insulation amplifier 310 provides reverse isolation between the oscillator 320 and an antenna and injects a signal into the oscillator 320.

The oscillator 320 detects the signal based on a start-up time difference. The oscillator 320 is adjusted by a quench signal generator (see FIGS. 1A and 2A) for generating a signal that blocks the oscillator or the power controller 360.

The envelope detector 330 detects an envelope of the oscillator 320.

The amplifier 340 amplifies an envelope signal of the oscillator 320 so that the oscillator 320 properly operates.

The slicer 350 recovers a digital signal from the envelope signal amplified by the amplifier 340.

The power controller 360 is connected to the insulation amplifier 310, the oscillator 320, the envelope detector 330, and the amplifier 340, and generates a duty cycle signal to turn on and off the overall power of a circuit.

Only when the power controller 360 turns on the power of the super regenerative receiver 300, is the signal received by the antenna injected into the oscillator 320 through the insulation amplifier 310. Then, the oscillator 320 samples the signal injected by the insulation amplifier 310 and starts oscillating.

The oscillator 320 starts oscillating a small signal before the power controller 360 turns on the power of the super regenerative receiver 300. Even after the amplifier 340 amplifies the envelope signal of the oscillator 320, a signal level lower than a reference voltage is maintained.

Referring to FIG. 3B, an RF input 371 is a OOK modulated RF signal. The power control clock 372 is a duty cycle power control signal of the power controller 360.

The converted digital signal that passes through the slicer 350 is "0". However, when the antenna receives an input signal, the oscillator 320 oscillates much faster before the overall power of the super regenerative receiver 300 turns off (373a). In this case, the oscillated signal has a very large amplitude and is saturated. The digital signal is detected as '1' (374a).

Figure 4A:
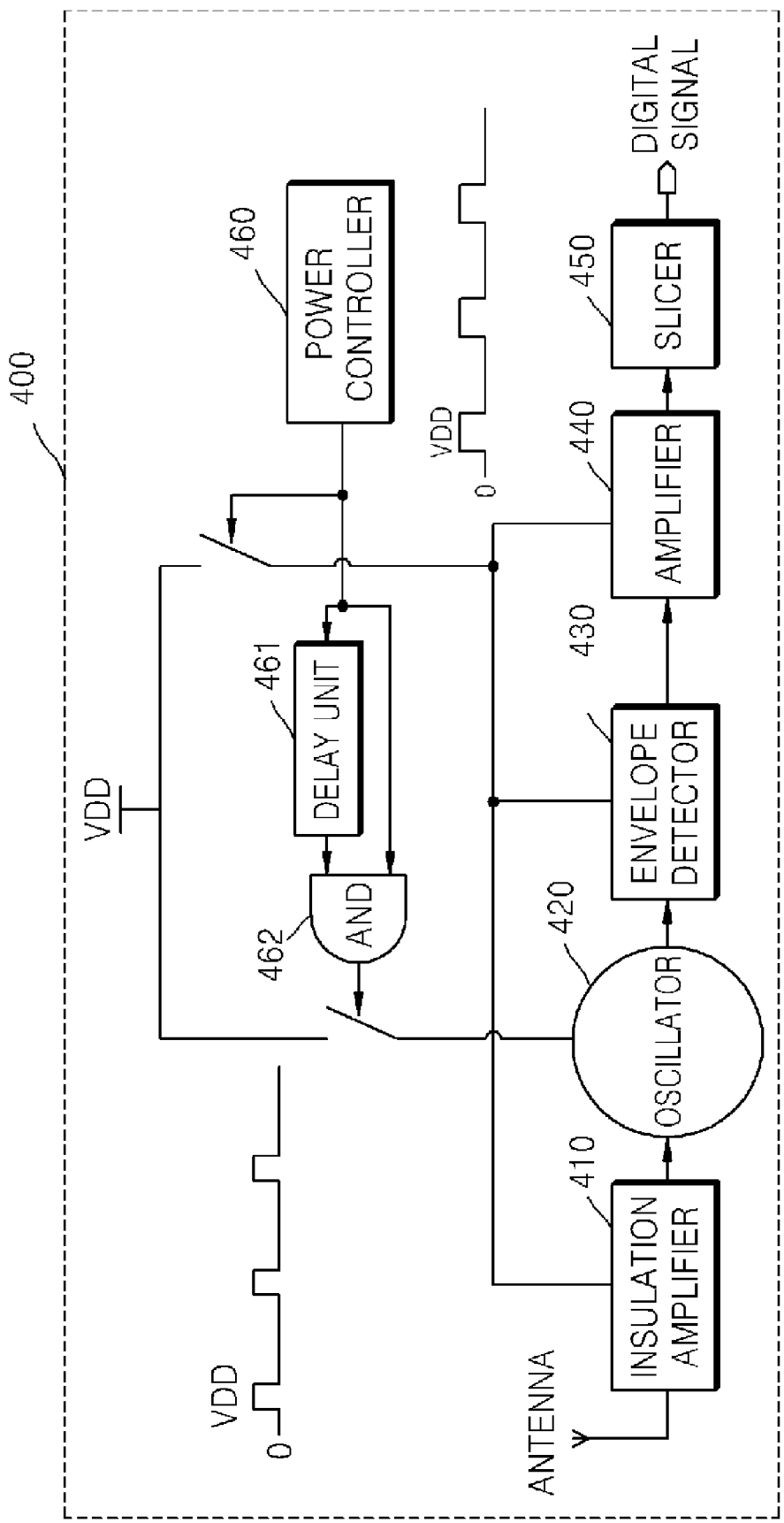

FIGS. 4A and 4B are, respectively, block and timing diagrams of a super regenerative receiver 400 for sequentially controlling a duty cycle, according to an embodiment of the present invention. The super regenerative receiver 400 is an improvement of the super regenerative receiver 300 shown in FIG. 3A. The elements shown in FIG. 4A corresponding to those shown in FIG. 3A are substantially identical or similar to each other and thus a detailed description thereof will not be repeated here.

A duty cycle signal 473 for adjusting the power on and off of an oscillator 420 is generated by a power control clock 472. The duty cycle signal 473 is smaller than the power control clock 472.

In more detail, the duty cycle signal 473, via a delay unit 461, is applied to the oscillator 420, so that other elements of the super regenerative receiver 400 are turned on and are stabilized before the oscillator 420 samples an input signal.

The delay unit 461 delays a power control clock input by the power controller 460, generates the delayed power control clock, and generates the power control clock from the oscillator 420 through an AND gate 462. (in claims: "a delay unit connected to the power controller and delaying the power supplied by the power controller"—same as description of delay unit 461 above? YES!!) In more detail, the super regenerative receiver 400 uses the delay unit 461 to turn other elements on and stabilize them before the oscillator 420 samples the input signal.

The super regenerative receiver 400 may further comprise a calibration circuit (not shown) for adjusting an oscillation frequency and a Q factor of the oscillator 420 in order to improve the performance thereof.

In this case, during calibration and detection periods, the super regenerative receiver 400 is turned on and adjusts the Q factor and oscillation frequency. During the detection period, the super regenerative receiver 400 performs the operation described above with reference to FIG. 4 without the calibration circuit. An example of the calibration circuit is a digital calibration circuit. The calibration circuit is a circuit for detecting an oscillating frequency, if the frequency is deviated, adjusting a capacitance component of the oscillator 420, and allowing the oscillator 420 to oscillate at a predetermined frequency.

The calibration period is a period when the oscillator 420 oscillates at the predetermined frequency while the super regenerative receiver 400 is turned off. In more detail, the calibration period excludes the detection period and a period when the super regenerative receiver 400 is turned on. Furthermore, the detection period is a period when the oscillator 420 oscillates in a steady state and detects a signal that passes through an envelope detector.

FIG. 5 is a block diagram of a super regenerative receiver 500 according to an embodiment of the present invention.

Referring to FIG. 5, the super regenerative receiver 500 comprises an oscillator 530 and a power controller 510.

The oscillator 530 depends on whether an input signal has an oscillation start-up time or not. The power controller 510 controls the supply of power to an insulation amplifier 520, an oscillator 530, an envelope detector 540, and an amplifier 550 only within the start-up period of the oscillator 530.

Alternatively, the super regenerative receiver 500 may further comprise a delay unit (not shown) as described with reference to FIGS. 4A and 4B.

The delay unit having one end connected to the power controller 510 and another end connected to the oscillator 530, supplies power to the oscillator 530 after the power controller 510 stably powers up the insulation amplifier 520, the envelope detector 540, and the amplifier 550.

However, the present invention is not limited thereto and other elements for realizing the super regenerative receiver 500 may be connected to the power controller 510 and may be turned on and off in order to reduce power consumption.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

The present invention uses a power controller used as a quenching means in a super regenerative receiver to reduce average power consumption of the super regenerative receiver while maintaining selectivity and sensitivity of the super regenerative receiver. Furthermore, by adjusting the duty cycle ratio of the power controller, it is possible to easily adjust the average power consumption of a wakeup receiver so as to meet requirements of the wakeup receiver. The present invention is also suitable for any other low data rate or low power applications.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A super regenerative receiver comprising:
   an oscillator having a start-up time period starting oscillation that varies according to an existence of an input signal;
   an insulation amplifier injecting a signal into the oscillator and providing reverse isolation of the input signal from the oscillator;
   an envelope detector detecting an envelope of the oscillator;
   an amplifier amplifying the envelope, and
   a power controller supplying power to the insulation amplifier, the oscillator, the envelope detector, and the amplifier within the start-up time period of the oscillator.

2. The super regenerative receiver of claim 1, wherein the power controller uses a duty cycle to supply power, and a duty cycle ratio between a clock off period and clock on period of the duty cycle is changed by adjusting the frequency of the duty cycle.

3. The super regenerative receiver of claim 2, wherein a power off period is extended until the frequency of the duty cycle is the same as a data rate of the input signal.

4. The super regenerative receiver of claim 1, further comprising: a delay unit connected to the power controller and delaying the power supplied by the power controller,
   wherein the oscillator is connected to the delay unit, and, if the power controller is connected to the insulation amplifier, the envelope detector, and the amplifier, the oscillator receives the delayed power through the delay unit.

5. The super regenerative receiver of claim 1, wherein the oscillator adjusts an oscillation frequency with a calibration circuit.

6. A method of reducing power consumption of a super regenerative receiver comprising an oscillator having a start-up time period starting oscillation that varies according to an existence of an input signal, wherein the method comprises:
   controlling power by supplying the power to the super regenerative receiver within the start-up time period of the oscillator, said controlling comprising:
   providing a start-up time period starting oscillation that varies according to an existence of an input signal;
   supplying power to the super regenerative receiver within the start-up time period of the oscillator;
   injecting a signal into the oscillator and providing reverse isolation of the input signal from the oscillator;
   detecting an envelope of the oscillator; and
   amplifying the envelope.

7. The method of claim 6, wherein the super regenerative receiver further comprises:

an insulation amplifier injecting a signal into the oscillator and providing reverse isolation of the input signal from the oscillator;

an envelope detector detecting an envelope of the oscillator; and an amplifier amplifying the envelope, wherein the controlling of the power comprises: supplying the power to the insulation amplifier, the oscillator, the envelope detector, and the amplifier within the start-up time period of the oscillator.

8. The method of claim 7, wherein the oscillator adjusts an oscillation frequency with a calibration circuit.

9. The method of claim 7, wherein the controlling of the power comprises:

supplying the power by using a duty cycle and changing a duty cycle ratio between a clock off period and clock on period of the duty cycle by adjusting the frequency of the duty cycle.

10. The method of claim 9, wherein a power off period is extended until the frequency of the duty cycle is the same as a data rate of the input signal.

11. The method of claim 7, further comprising: delaying the power generated in the controlling of the power, wherein the power is supplied to the oscillator after the power is delayed, and the power is directly supplied to the insulation amplifier, the envelope detector; and the amplifier.

* * * * *